United States Patent
Thomas

(10) Patent No.: US 10,281,910 B2
(45) Date of Patent: May 7, 2019

(54) ROUTE PLANNING

(71) Applicant: BAE Systems plc, London (GB)

(72) Inventor: Peter Norman Thomas, Preston (GB)

(73) Assignee: BAE Systems plc, London (GB)

( * ) Notice: Subject to any disclaimer, the term of this patent is extended or adjusted under 35 U.S.C. 154(b) by 189 days.

(21) Appl. No.: 15/321,275

(22) PCT Filed: Jun. 26, 2015

(86) PCT No.: PCT/GB2015/000200
§ 371 (c)(1),
(2) Date: Dec. 22, 2016

(87) PCT Pub. No.: WO2015/198004
PCT Pub. Date: Dec. 30, 2015

(65) Prior Publication Data
US 2017/0160736 A1  Jun. 8, 2017

(30) Foreign Application Priority Data
Jun. 26, 2014 (GB) .................................. 1411377.3

(51) Int. Cl.
*G01C 21/20* (2006.01)
*G05D 1/00* (2006.01)
(Continued)

(52) U.S. Cl.
CPC .......... *G05D 1/0005* (2013.01); *B64C 39/024* (2013.01); *G01C 21/20* (2013.01); *B64C 2201/00* (2013.01); *G08G 5/0069* (2013.01)

(58) Field of Classification Search
CPC ............................ G05D 1/0005; B64C 39/024; B64C 2201/00; G01C 21/20; G08G 5/0069
See application file for complete search history.

(56) References Cited

U.S. PATENT DOCUMENTS

2006/0178819 A1  8/2006  Couckuyt
2010/0088011 A1  4/2010  Bruce

FOREIGN PATENT DOCUMENTS

GB     2440249 A        1/2008
WO     2014033444 A1    3/2014
WO     WO-2014033444 A1 *  3/2014  ......... G01C 21/3446

OTHER PUBLICATIONS

Search Report for Application No. GB1411377.3, dated Dec. 5, 2014, 3 pages.

(Continued)

*Primary Examiner* — Nadeem Odeh
*Assistant Examiner* — Michael V Kerrigan
(74) *Attorney, Agent, or Firm* — Maine Cernota & Rardin

(57) ABSTRACT

Disclosed is a method and apparatus for determining a route for a vehicle (2). The method comprises generating, by a processor (12), a grid (16) by specifying a start node (18), specifying one or more movement operations performable by the vehicle (2), and iteratively adding edges and further nodes (20-24) to the grid (16), each edge corresponding to a respective movement operation and each further node corresponding to a location for the vehicle (2). The one or more processors (12) then select a path through the grid (16) from a first node of the grid to a second node of the grid. The first node corresponds to a first location (A) for the vehicle (2) and the second node corresponds to a second location (B) for the vehicle (2). Thus, a route for the vehicle (2) from the first location (A) to the second location (B) is determined.

14 Claims, 5 Drawing Sheets

(51) Int. Cl.
*B64C 39/02* (2006.01)
*G08G 5/00* (2006.01)

(56) References Cited

OTHER PUBLICATIONS

International Search Report and Written Opinion of Application No. PCT/GB2015/000200, dated Sep. 16, 2015, 11 pages.
International Preliminary Report on Patentability for Appl No. PCT/GB2015/000200, dated Dec. 27, 2016, 9 pages.

* cited by examiner

ROUTE PLANNING

RELATED APPLICATIONS

This application is a National Phase application filed under 35 USC § 371 of PCT Application No. PCT/GB2015/000200 with an International filing date of Jun. 26, 2015 which claims priority of GB Patent Application 1411377.3 filed Jun. 26, 2014. Each of these applications is herein incorporated by reference in their entirety for all purposes.

FIELD OF THE INVENTION

The present invention relates to determining routes for vehicles.

BACKGROUND

Many route planning algorithms are known and may be used to determine routes for vehicles, which may then be followed by those vehicles.

Many route planners that operate in an infinite space, for example a 2- or 3-dimensional space of real numbers, make the space in which the route planning problem is to be solved finite by using a grid of nodes.

Typically, a coarse grid produces a small finite space, while a fine grid produces a larger finite space.

Many route planners implement a regular rectangular grid to define the route nodes. However, using such a grid of nodes tends to result in routes being generated that the vehicle is not able to follow.

SUMMARY OF THE INVENTION

In a first aspect, the present invention provides a method of determining a route for a vehicle. The method comprises generating, by one or more processors, a grid. Generating the grid comprises specifying a start node, specifying one or more movement operations performable by the vehicle, and, one or more times, iteratively performing steps (i) and (ii). Step (i) comprises either: for the first iteration of steps (i) and (ii), for each movement operation, adding, to the grid, an edge having a first end and an opposite second end, the first end of each edge being connected to the start node; or, for the second and subsequent iterations of steps (i) and (ii), for each node added to the grid in a preceding iteration of steps (i) and (ii) and for each movement operation, adding, to the grid, an edge having a first end and an opposite second end, the first end of each edge being connected to that node. Step (ii) comprises, adding to the grid, at the second end of each of the edges added to the grid at step (i) of the current iteration of steps (i) and (ii), a further node. The method further comprises selecting, by the one or more processors, a path through the grid from a first node of the grid to a second node of the grid. The first node corresponds to a first location for the vehicle and the second node corresponds to a second location for the vehicle different to the first location. Thus, a route for the vehicle from the first location to the second location is determined.

The method may further comprise controlling, by a controller operatively coupled to the one or more processors, the vehicle such that the vehicle follows the determined route.

The method may further comprise specifying a cost function.

The step of selecting a path through the grid may comprise selecting a path that optimises the cost function.

The method may further comprise specifying an optimisation algorithm.

Optimising the cost function may comprise implementing the specified optimisation algorithm.

The method may further comprise defining a plurality of stages for the route. The steps of generating a grid and selecting a path through the grid may be performed for each of the defined stages so as to produce a plurality of routes, each route of the plurality of routes being associated with a respective defined stage. The method may further comprise combining the plurality of routes to produce a final route for the vehicle.

For each stage, a set of one or more movement operations used to generate the grid for that stage may be different to a set of one or more movement operations used to generate the grid for each of the other stages.

The method may further comprise, for each stage, specifying a different cost function. For each stage, the step of selecting a path through the grid may comprise selecting a path that optimises the cost function specified for that stage.

The method may further comprise, for each stage, specifying a different optimisation algorithm. For each stage, optimising the cost function may comprise implementing the optimisation algorithm specified for that stage.

The one or more processors may be located onboard the vehicle.

The vehicle may be an unmanned aircraft.

In a further aspect the present invention provides apparatus for determining a route for a vehicle. The apparatus comprises one or more processors configured to generate a grid. The one or more processors are configured to specify a start node, specify one or more movement operations performable by the vehicle, and, one or more times, iteratively perform steps (i) and (ii). Step (i) comprises either: for the first iteration of steps (i) and (ii), for each movement operation, adding, to the grid, an edge, each edge having a first end and an opposite second end, the first end of each edge being connected to the start node; or for the second and subsequent iterations of steps (i) and (ii), for each node added to the grid in a preceding iteration of steps (i) and (ii) and for each movement operation, adding, to the grid, an edge having a first end and an opposite second end, the first end of each edge being connected to that node. Step (ii) comprises, adding to the grid, at the second end of each of the edges added to the grid at step (i) of this iteration of steps (i) and (ii), a further node. The one or more processors are further configured to select a path through the grid from a first node of the grid to a second node of the grid. The first node corresponds to a first location for the vehicle and the second node corresponds to a second location for the vehicle different to the first location. Thus, the one or more processors are configured to determine a route for the vehicle from the first location to the second location.

The one or more processors may be located onboard the vehicle.

The apparatus may further comprise a controller located onboard the vehicle and operatively coupled to the one or more processors). The controller may be configured to control the vehicle such that the vehicle follows the determined route.

In a further aspect, the present invention provides an unmanned aircraft comprising apparatus according to the preceding aspect.

In a further aspect, the present invention provides a program or plurality of programs arranged such that when executed by a computer system or one or more processors it/they cause the computer system or the one or more processors to operate in accordance with the method according to the first aspect.

In a further aspect, the present invention provides a machine readable storage medium storing a program or at least one of the plurality of programs according to the preceding aspect.

DETAILED DESCRIPTION

Figure 1:
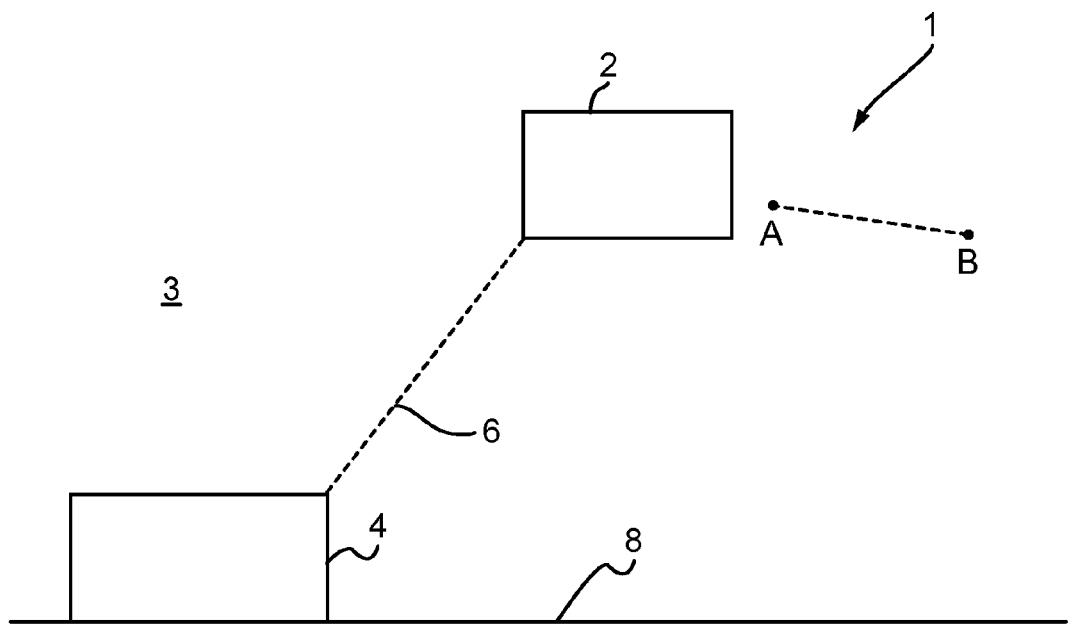
FIG. 1 is a schematic illustration (not to scale) showing an example scenario in which an embodiment of a route planning method is to be implemented.

In the following description, like reference numerals refer to like elements.

The following description is based on embodiments of the invention and should not be taken as limiting the invention with regard to alternative embodiments that are not explicitly described herein.

Referring now to the Figures, FIG. 1 is a schematic illustration (not to scale) showing an example scenario 1 in which an embodiment of a route planning method is to be implemented.

In this scenario 1, an unmanned aircraft 2 is configured to fly within a region if airspace 3. The aircraft 2 is to travel from a first point (point A) within the region of airspace 3 to a second point (point B) in the region of airspace 3. As described in more detail later below with reference to FIG. 3, the route to be traveled by the aircraft 2 between points A and B is to be determined and followed by the aircraft 2.

In this scenario 1, the aircraft 2 is connected to a ground station 4 by a wireless radio frequency (RF) communication link 6. The ground station 4 is located on the ground 8. The communication link 6 is such that information, for example parameter values for use by the aircraft 2 when determining the route, may be sent between the ground station 4 and the aircraft 2.

Figure 2:
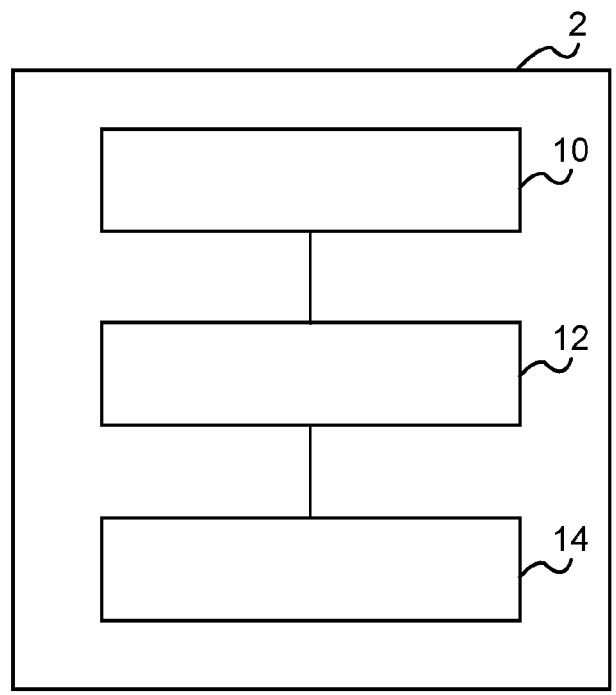
FIG. 2 is a schematic illustration (not to scale) of an aircraft.

FIG. 2 is a schematic illustration (not to scale) of the aircraft 2.

In this embodiment, the aircraft 2 comprises a transceiver 10, a processor 12, and a controller 14.

The transceiver 10 is configured to transmit information to the ground station 4 via the communication link 6. Also, the transceiver 10 is configured to receive information from the ground station 4 via the communication link 6. The transceiver 10 is connected to the processor 12 such that information may be sent between the transceiver 10 and the processor 12.

The processor 12 is configured to, using information received from ground station 4 via the transceiver 10, determine a route for the aircraft 2. An embodiment of the route determination algorithm performed by the processor 12 is described in more detail later below with reference to FIG. 3.

In addition to being connected to the transceiver 10, the processor 12 is connected to the controller 14 such that information, for example a route specification, may be sent between the processor 12 and the controller 14.

In this embodiment, the controller 14 is configured to control the aircraft 2 in accordance with a route specification determined by and received from the processor 12.

Apparatus, including the processor 12, for implementing the above arrangement, and performing the method steps to be described later below, may be provided by configuring or adapting any suitable apparatus, for example one or more computers or other processing apparatus or processors, and/or providing additional modules. The apparatus may comprise a computer, a network of computers, or one or more processors, for implementing instructions and using data, including instructions and data in the form of a computer program or plurality of computer programs stored in or on a machine readable storage medium such as computer memory, a computer disk, ROM, PROM etc., or any combination of these or other storage media.

It should be noted that certain of the process steps depicted in the below described process flowcharts may be omitted or such process steps may be performed in differing order to that presented below and shown in those process flowcharts. Furthermore, although all the process steps have, for convenience and ease of understanding, been depicted as discrete temporally-sequential steps, nevertheless some of the process steps may in fact be performed simultaneously or at least overlapping to some extent temporally.

Figure 3:
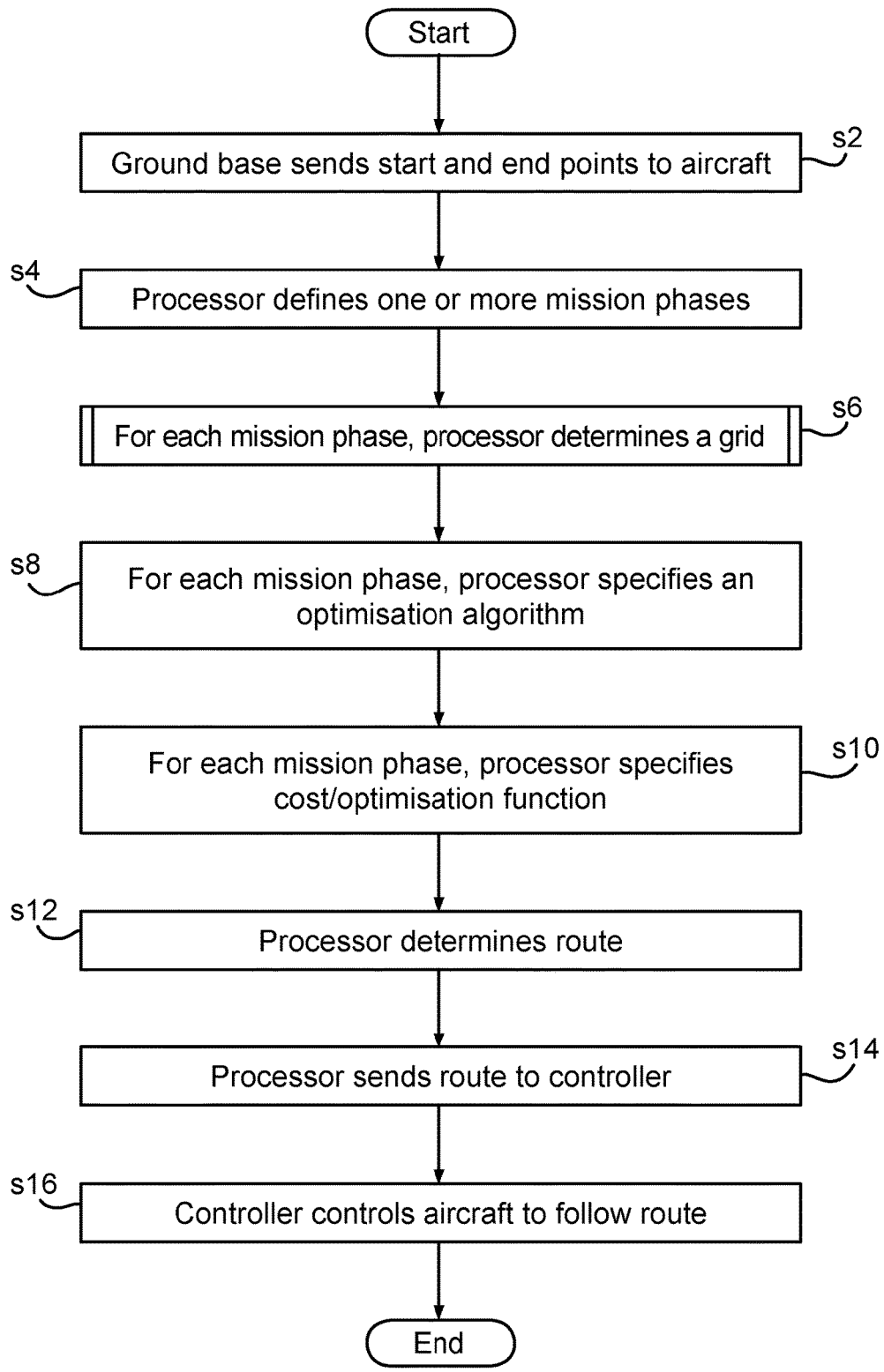
FIG. 3 is a process flow chart showing certain steps of an embodiment of a route determination and following process.

FIG. 3 is a process flow chart showing certain steps of an embodiment in which the aircraft 2 determines and follows a route.

At step s2, the ground base 4 sends specifications of the first and second points A, B to the aircraft 2.

The first and second points A, B may be specified in any appropriate format, for example, using a coordinate for a point on the Earth's surface, and an altitude above that specified point on the Earth's surface.

In this embodiment, the first point A is defined to be a current location of the aircraft 2. However, in other embodiments the first point A is a different point, other than the aircraft's current location. In this embodiment, the second point B is a point within the airspace 3 that is remote from the first point A. The first and second points A, B may be spaced apart by any appropriate distance, for example, 100 km or 1,000 km.

In this embodiment, after being received by the transceiver 10, the transceiver 10 sends the specifications for the first and second points A, B to the processor 12.

At step s4, the processor 12 defines one or more "mission phases" for the route.

The terminology "mission phase" is used herein to refer to a stage of the route during which the aircraft performs a certain action, for example, a take-off action, a climb action, a cruise action, a descent action, and a landing action.

In this embodiment the mission phases are sequential, i.e. are performed by the aircraft in sequence.

In this embodiment, each mission phase has a different set of criteria that must be satisfied during that mission phase.

For example, some mission phases have different restrictions on operations that may be performed by the aircraft 2 compared with other mission phases. Examples of aircraft operation restrictions include, but are not limited, a restriction on the aircraft's ability to turn, a maximum/minimum altitude above/below which the aircraft 2 is not permitted to fly, a maximum/minimum speed above/below which the aircraft 2 is not permitted to operate, etc.

Example mission phases for a route that may be defined by the processor 12 include, but are not limited to: a take-off phase, a climb out phase, a turn phase, a cruise phase, an ingress phase, a phase in which the aircraft flies proximate to a particular target/entity such as an unfriendly vehicle, a descend phase, an approach phase, and a landing phase.

Splitting the route planning problem into separate mission phases advantageously tends to ease computational burden on the processor 12 and facilitate the solving of large route planning problems in a reasonable amount of time.

At step s6, for each mission phase, the processor 12 specifies or generates a grid that is to be used to determine the route for the aircraft 2 from the first point A to the second point B.

Figure 4:
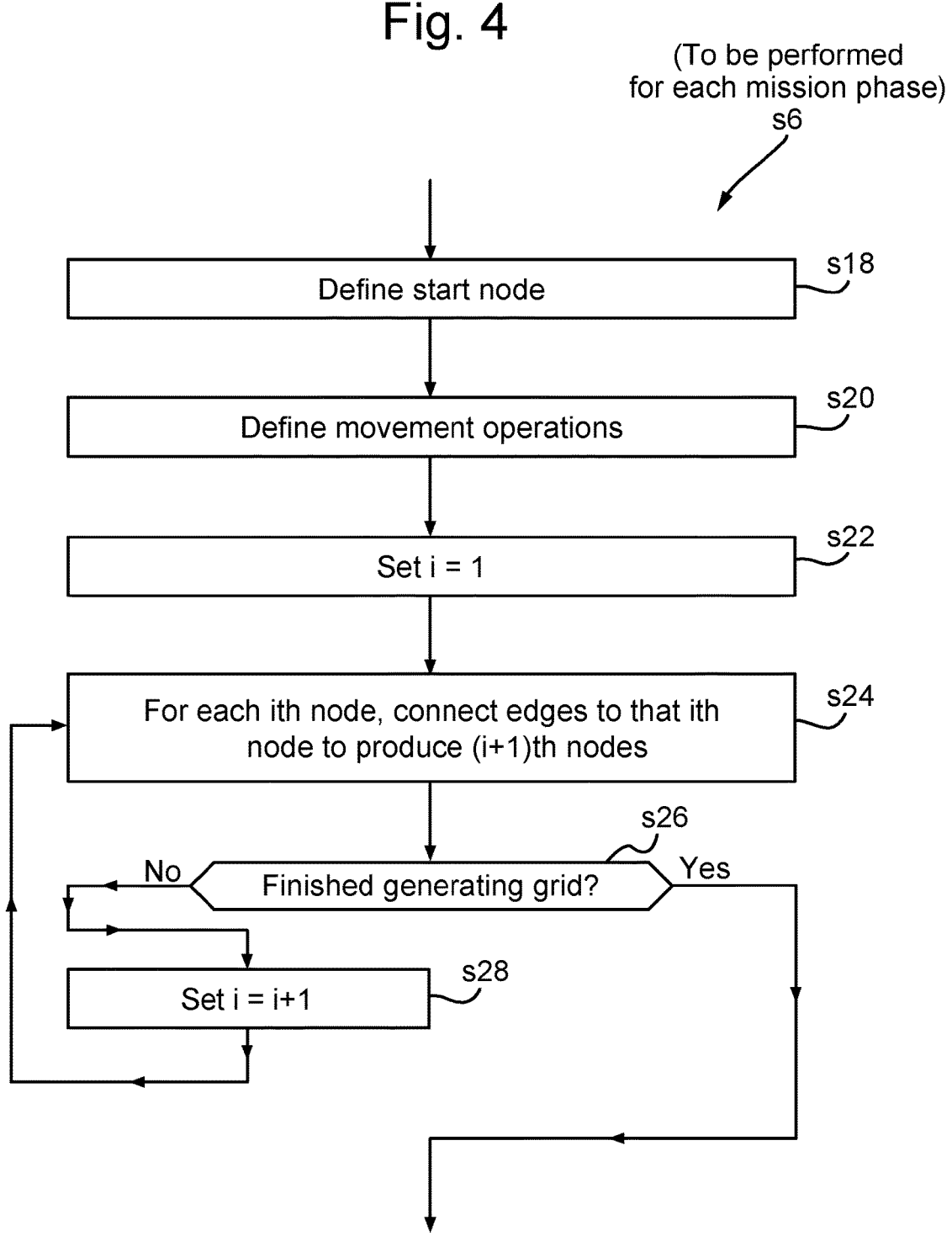
FIG. 4 is a process flow chart showing certain steps of a grid generation process.

FIG. 4 is a process flow chart showing certain steps of an embodiment of a process for determining a grid for a mission phase. In this embodiment, the process of FIG. 4 is performed for each mission phase separately such that a respective grid is generated for each mission phase.

Steps s8 to s16 of FIG. 3 will be described in more detail later below after the description of FIG. 4.

Figure 5:
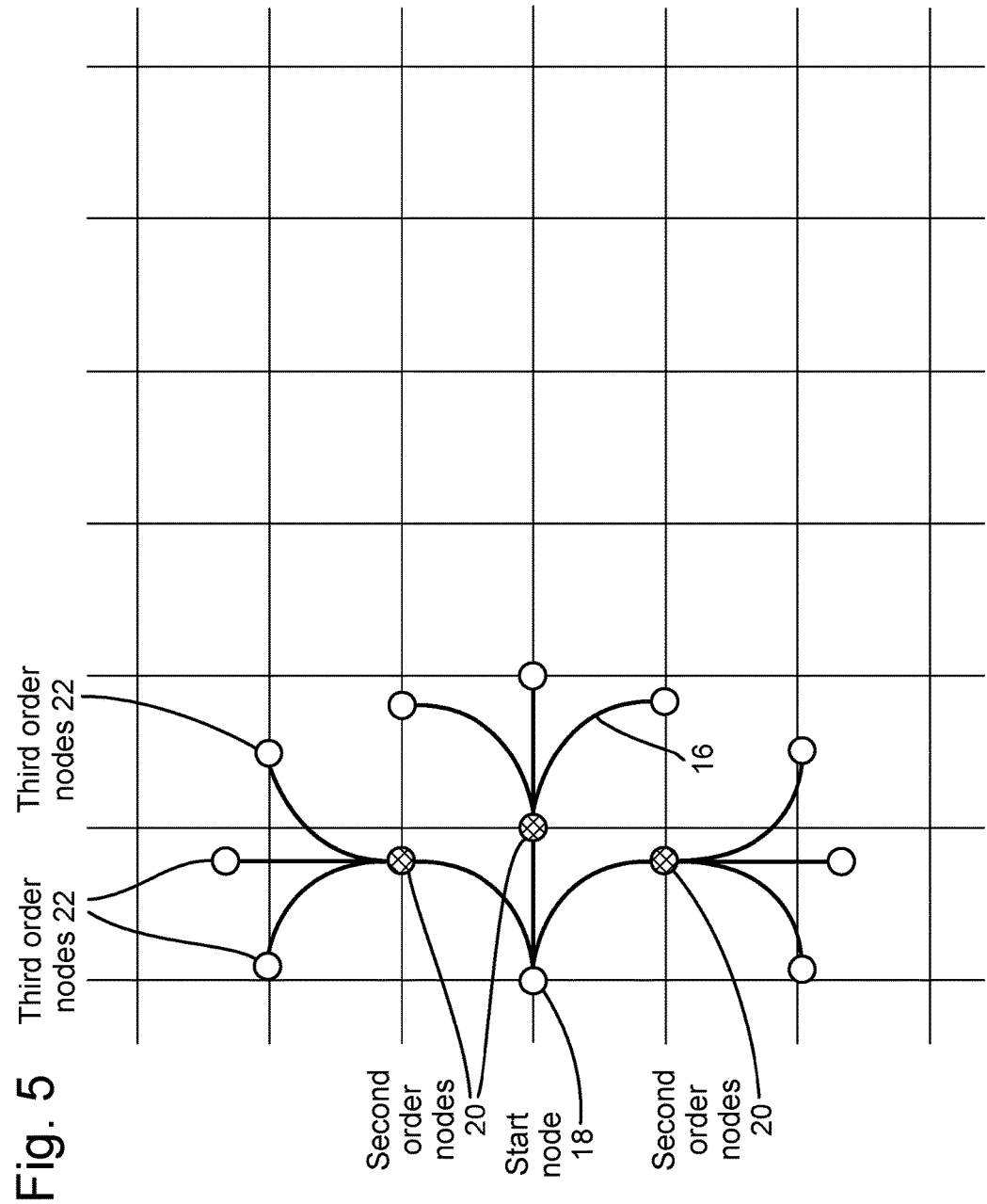
FIG. 5 is a schematic illustration (not to scale) illustrating generation of a grid.
Figure 6:
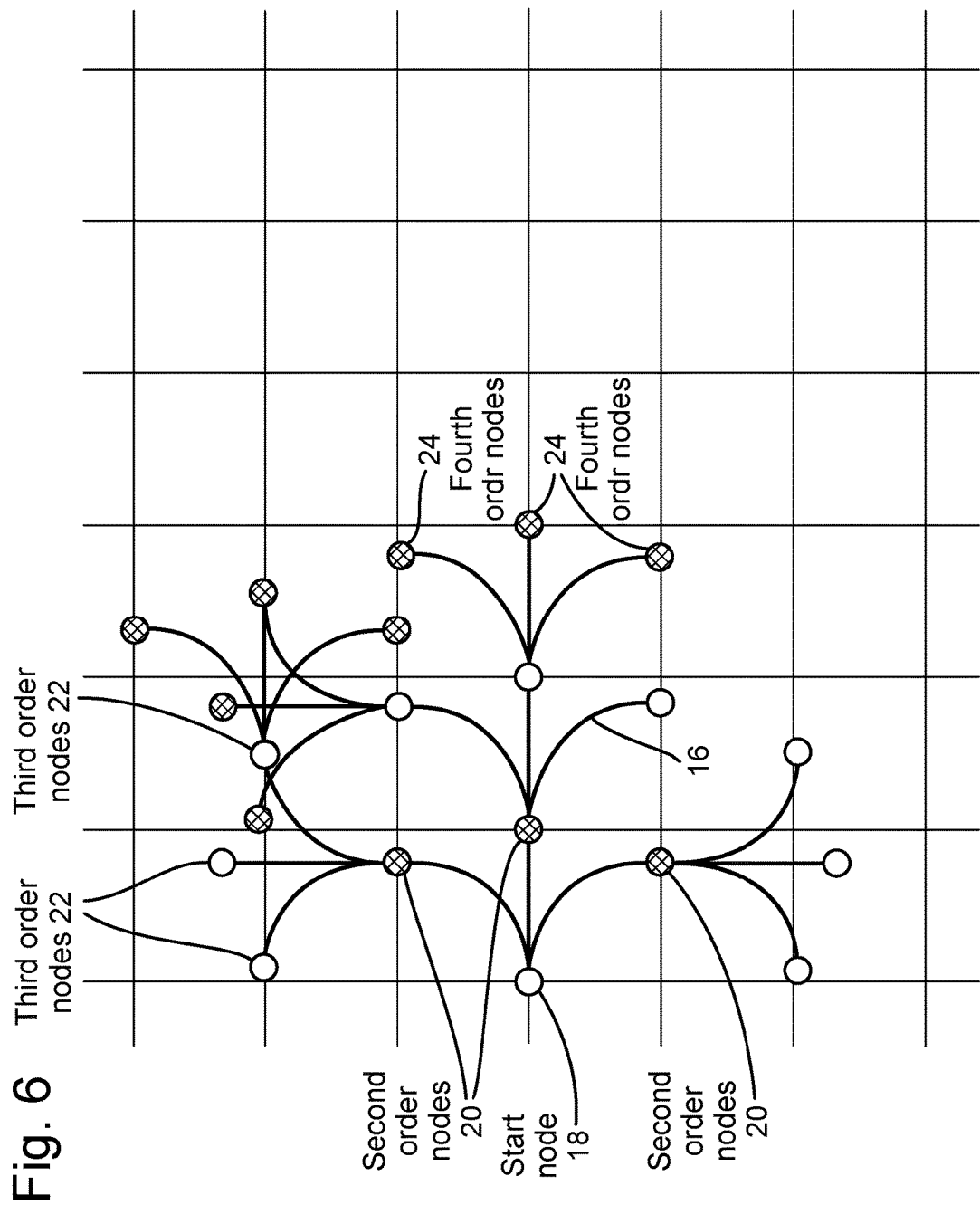
FIG. 6 is a schematic illustration (not to scale) illustrating generation of the grid.

FIG. 5 and FIG. 6 are schematic illustrations (not to scale) illustrating the generation of a grid 16 for a mission phase, as performed by the processor 12 at step s6.

Referring to FIG. 4, at step s18, the processor 12 defines a start node 18 for the grid 16.

In this embodiment, for the first mission phase, the start node 18 for the grid 16 is the current location of the aircraft 2. In other embodiments, the start node 18 of the first mission phase is a different location, e.g. a future location of the aircraft 2 or the first point A. The start node 18 is the $1^{st}$ node.

In some embodiments, the first point A and the current location of the vehicle 2 are coincident.

The processor 12 may use measurements of the aircraft's current location (or any other appropriate parameters) to specify the start node 18. Such measurements may be taken by sensors onboard the aircraft 2, or may communicated to the aircraft 2 by, for example, the ground station 4.

The start node 18 of subsequent mission phases (i.e. mission phases following the first mission phase) may be equal to the end node of a preceding mission phase. Thus, in some embodiments, a grid for a mission phase is determined after the route for the preceding mission phase has been determined.

At step s20, for the current mission phase, one or more movement operations, or moves, that may be performed by the aircraft 2 are specified. Each movement operation is an operation that is performable by the aircraft in a predetermined amount of time, or in a predetermined distance. The movement operations defined for a mission phase may be dependent upon any requirements or criteria that need to be fulfilled by the aircraft 2 during that mission phase.

For example, for a "take off" mission phase, specified movement operations for the aircraft 2 may include but are not limited to a "climb" operation which corresponds to the aircraft increasing its altitude by a predetermined amount, a "fly level" operation which corresponds to the aircraft maintaining its current altitude, and a "descend" operation which corresponds to the aircraft decreasing its altitude by a predetermined amount.

Also for example, for a "cruise" mission phase, specified movement operations may include but are not limited to "fly straight", "turn right", and "turn left" movement operations. Each movement operation may cover a predefined distance of, say, 1 km. Thus, the "fly straight" operation may correspond to the aircraft 2 flying straight for a distance of 1 km.

Also, the "turn right" operation may correspond to the aircraft 2 flying a total distance of 1 km and turning right (from the aircraft's point of view and current heading) through 90°. Also, the "turn left" operation may correspond to the aircraft 2 flying a total distance of 1 km and turning left (from the aircraft's point of view and current heading) through 90°.

At step s22, an index i is set to be equal to 1.

At step s24, for each of the ith nodes of the grid 16, for each movement operation specified for the current mission phase, an edge corresponding to that movement operation is connected to that ith node. Also, for each edge added to the grid 16 at step s24, an (i+1)th node is defined to be located at an end of that edge that is opposite to the end at which the ith node is located.

In this embodiment, each node represents a location for the aircraft 2. An edge connecting together two nodes represents a route between the two locations represented by those two nodes. An edge for a particular movement operation represents a route that would be followed by the aircraft 2 if the aircraft 2 performed that movement operation.

At step s26, it is determined whether or not the grid 16 for the current mission phase has been completed.

Any appropriate criteria may be used to determine whether or not the grid 16 for the current mission phase is complete. For example, the grid 16 for the current mission phase may be deemed to be complete if step s24 has been iterated a predetermined number of times, for example, 10 times or 100 times. Also, for example, the grid 16 for the current mission phase may be deemed to be complete if at least one of the nodes of the grid 16 is within a predetermined distance, e.g. 1 km or 10 km, of a specified location (e.g. the second point B).

If, at step s26, it is determined that the grid 16 is complete, the method of FIG. 4 ends. In some embodiments, the method then proceeds to step s8 of FIG. 3. In some embodiments, grids for the remaining mission phases are generated by repeating the process of FIG. 4 for each of those mission phases.

However, if, at step s26, it is determined that the grid 16 is not complete, the method of FIG. 4 proceeds to step s28.

At step s28, the index i is increased by 1, i.e. i=i+1.

After step s28, the method of FIG. 4 returns to step s24. Thus, steps s24 to s28 are iterated until the grid 16 for the mission phase has been generated.

FIG. 5 shows a grid 16 generated using the moves operations "fly straight", "turn right", and "turn left". Edges (indicated by solid lines in the Figures) corresponding to each of these three movement operations have been connected to the start (i=1) node 18 to produce three second order (i=2) nodes 20. Further edges corresponding to each of the three movement operations have then been connected to each of the second order nodes 20 to produce nine third order (i=3) nodes 22.

FIG. 6 illustrates part of the next stage of the grid generation process in which, to third order nodes 22, further edges corresponding to each of the three movement operations are connected to produce fourth order (i=4) nodes 24. For ease of illustration, in FIG. 6, only some fourth order nodes 24 are shown. However, it will be appreciated by the skilled person that edges and fourth order nodes 24 are connected to each of the third order nodes 22.

In some embodiments, it may be found that two or more different paths along the edges of a generated grid 16 lead to a common node. For example, it may be the case that the sequence of movement operations "turn left", "turn right" and "fly straight" produces the same state vector for the aircraft 2 as the sequence of movement operations "fly straight", "turn left", and "turn right". In some embodiments, if multiple paths lead to a common node, paths may be discarded such that only a single path leads to each of the nodes in the grid 16, thereby simplifying a grid.

In this embodiment, the movement operations form the edges of the grid 16 that connect together the nodes 18-24 of the grid 16. In this embodiment, each edge of the grid 16 corresponds to a distance of 1 km. Thus, if the aircraft 2 was to fly with an equivalent ground speed of 200 m/s, each edge of the grid 16 would correspond to 5 s time step. In other embodiments, one or more of the edges of the grid 16 may have a different length other than 1 km. For example, in some embodiments, a grid having an edge length of 10 km or 0.1 km may be used. The edge length of a grid may be determined using any appropriate parameters Thus, a process for determining a grid for a mission phase is provided.

Advantageously, because the edges of the grid 16 correspond to movement operations that are performable by the aircraft 2, each path through the grid 16 tends to define an allowable route that aircraft 2 may follow. This tends to be in contrast to conventional methodologies which use, for example, rectangular grids. Some paths through a rectangular grid may correspond to routes that the aircraft 2 is not able or not permitted to follow.

Referring to FIG. 3, at step s8, for each mission phase, the processor 12 specifies an optimisation algorithm to be used to determine a route for that mission phase. The optimisation algorithm that is specified for a particular mission phase may depend on the requirements of that mission phase, or the criteria that are to be satisfied during that phase. An optimisation algorithm specified for a given mission phase may be different to the optimisation algorithm specified for a different mission phase. However, in some embodiments a common optimisation algorithm is used for all mission phases.

Examples of appropriate optimisation algorithms that may be specified for a mission type include, but are not limited to an "improvement algorithm" and a "constructive algorithm".

Improvement Algorithms begin with a one or more "seed routes" or start routes, and seek to improve it/them. For example, a start route for an improvement algorithm being used for a mission phase may be a straight line between the aircraft's start point and the aircraft's finishing point during that mission phase. The improvement algorithm may then be iterated to process the straight route so as to generate successively better routes which are flyable by the aircraft and account for any restrictions etc. in place.

Examples of improvement algorithms include, but are not limited to: genetic algorithms, such as genetic hill-climbing algorithms, and hill-climbing algorithms.

Constructive Algorithms construct a route from the start point for a mission phase to the end point of that mission phase. Constraints may be applied immediately by making sure that only allowable routes are generated. Advantageously, constructive algorithms may be used to produce good routes (ideally optimal routes) from a start point to an end point.

Examples of appropriate constructive optimisation algorithms that may be used to search the grid/graph and construct a route from a start point to a finish point include, but are not limited to: Uninformed Algorithms such as a Depth First Search algorithm and a Breadth First Search algorithm; Backward Looking Algorithms such as a Uniform Cost Search algorithm (e.g. Dijkstra's Algorithm); Forward Looking Algorithms such as a Best First Search algorithm; and Forward and Backward Looking Algorithms such as an A* Algorithm.

A Uniform Cost Search algorithm tends to be good for avoiding areas of high cost (such as threat areas).

Forward and Backward Looking algorithms tend to provide the advantages of both forward and Backward Looking type algorithms.

An A* Algorithm may be used to minimise a function F(x) where F(x)=G(x)+H(x), and G(x) is a cost incurred from the start point to x and H(x) is an estimate of cost from x to the finish point. Preferably, the heuristic H(x) is less than or equal to the true cost from x to the finish. Preferably, H(x) is quick to evaluate. Advantageously, the A* Algorithm tends to be complete, i.e. the algorithm tends to find a solution if one exists. Also, an A* Algorithm tends to be optimally efficient for any heuristic H.

There are a number of variations of the A* Algorithm that may be used. Preferably, an A* Algorithm that uses less memory than the standard A* Algorithm is used.

In some embodiments, a combination of constructive and improvement algorithms is used. For example, a construction algorithm may be used to generate one or more initial flyable route, which may subsequently be improved using an improvement algorithm.

At step s10, for each mission phase, the processor 12 specifies a cost function to be optimised during the determination of a route for that mission phase.

In this embodiment, the optimisation of a cost function is to be performed by minimising that cost function. However, in other embodiments, a cost function is optimised in a different way, for example, by maximising that cost function.

The processor 12 specifying a cost function for a mission phase may also include the processor 12 specifying one or more parameters that are to be varied in order to optimise that cost function.

For a mission phase, the cost function specified for that mission phase may be selected depending on the criteria to be satisfied, and any other restrictions, associated with that mission phase.

Each cost function is a function of one or more parameters.

In this embodiment, only a single cost function is specified for each mission phase. For mission phases for which multiple factors or parameters are to be considered, these multiple parameters are combined into a single cost function, for example, using weighting coefficients. In other embodiments, multiple cost functions may be specified for a mission phase. For a mission phase, the weighting coefficients of the cost function associated for that mission phase may be selected depending on the criteria to be satisfied, and any other restrictions, associated with that mission phase.

In this embodiment, a different cost function (including the weightings of its components) is specified for each mission phase. However, in other embodiments, a cost function associated with a mission phase may be the same as a cost function associated with one or more different mission phases.

For the "take off" mission phase and/or "climb out" mission phase, an appropriate cost function may be $f_1$ (which is to be minimised), where:

$$f_1 = \text{Fuel Burn (kg)} + c_1 * \text{Estimated Threat Exposure in first few seconds of a Turn Operation}$$

where $c_1$ is a value larger than 1, for example, 1000 or some other appropriate value.

In this embodiment, the threat of exposure (e.g. to an identified enemy vehicle) during the mission phase is deemed to be more important than fuel usage during that mission phase and, thus, the "estimated threat of exposure" parameter is multiplied by a larger coefficient than the "fuel burn" parameter.

Function $f_1$ may be minimised by varying the following parameters: "Engine Setting", and "Height at end of Climb-Out". The Engine Setting parameter may influence aircraft acceleration, fuel burn, required runway length, aircraft speed, and aircraft climb rate. The Engine Setting parameter may influence the climb rate achievable by the aircraft. Other parameters may also be considered in the minimisation of $f_1$, for example, a "Threats" parameter that may specify a required height for the aircraft outside an airbase, and may influence the climb rate of the aircraft, For other mission phases, different cost functions may be specified. Examples of other appropriate cost functions to be minimised include, but are not limited to:

$f_2$=Fuel Burn (kg)+$c2$*Threat Exposure where $c_2$ may be equal to 1000 or some other appropriate value.

$f_3$=Fuel Burn (kg)+$c3$*Threat Exposure+
   $c_4$*Estimated Threat Exposure in early part of
   Penetration Operation where $c_3$ may be equal to 1000 or some other appropriate value, and $c_4$ may be equal to 1000 or some other appropriate value.

$f_4$=Fuel Burn (kg)+$c_5$*Threat Exposure(including
   detection possibilities) where $c_5$ may be equal
   to 1000 or some other appropriate value.

$f_5$=Fuel Burn (kg)+$c_6$*Threat Exposure(including
   detection possibilities)+Potential penalties for
   Not Viewing/Attacking a Target in a Target
   Area+$c_7$*potential damage from natural envi-
   ronment+$c_8$*potential damage from hitting the
   ground.

where $c_8$ may be equal to 1000 or some other appropriate value, and $c_7$ may be equal to 100 or some other appropriate value, and $c_8$ may be equal to 1000 or some other appropriate value.

A cost function may be minimised by varying any appropriate set of parameters. Examples of parameter sets that may be varied in order to minimise an optimisation function include but are not limited to:

- a set consisting of: the "Engine Setting" parameter and the "Height at end of Climb-Out" parameter;
- a set consisting of: the "Engine Setting" parameter, a "Climb Angle" parameter, a "Bank Angle" parameter, and a "Height at end of Climb-Out" parameter;
- a set consisting of: the "Engine Setting" parameter, the "Climb Angle" parameter, the "Bank Angle" parameter, a "Heading at end of Turn" parameter, a "Height at Start of Cruise" parameter, and a "Height and Speed at End of Cruise" parameter;
- a set consisting of: the "Engine Setting" parameter, the "Climb Angle" parameter, the "Bank Angle" parameter, an "Aircraft Speed" parameter, the "Height at Start of Cruise" parameter, the "Height and Speed at End of Cruise" parameter, and a "Heading during Ingress" parameter;
- a set consisting of: the "Engine Setting" parameter, the "Climb Angle" parameter, the "Bank Angle" parameter, the "Aircraft Speed" parameter, the "Height at Start of Cruise" parameter, the "Height and Speed at End of Cruise" parameter, the "Heading during Ingress" parameter, a "Heading in Target Area" parameter, and a "Heading during Egress" parameter;
- a set consisting of: the "Engine Setting" parameter, the "Climb Angle" parameter, the "Bank Angle" parameter, the "Aircraft Speed" parameter, the "Heading during Ingress" parameter, the "Heading in Target Area" parameter, and the "Heading during Egress" parameter;
- a set consisting of: the "Engine Setting" parameter, the "Climb Angle" parameter, the "Bank Angle" parameter, the "Aircraft Speed" parameter, the "Heading in Target Area" parameter, and the "Heading during Egress" parameter.

Weather conditions, for example as measured by sensing equipment onboard the aircraft 2 or as provided to the aircraft by the ground station 4, may also be considered during the minimisation of one or more of the optimisation functions.

For the cost functions, details such as the precise location of all threats to the aircraft (such as the precise locations of Man-portable air-defense systems (ManPADs)) tend not to be required. However, that there are threats in an area may be considered.

In some embodiments, for one or more of the mission phases, functions for determining or estimating past and/or future costs associated with that mission phase may also be specified.

For example, for optimisation algorithms that look backwards (e.g. Backward Looking algorithms, and Forwards and Backward looking algorithms), it is often desirable to use a function for calculating costs previously incurred. Thus, in this embodiment, for each mission phase for which an optimisation algorithm that looks backwards is specified, a function for calculating costs that have been incurred is specified.

Examples of functions for calculating costs incurred include, but are not limited to: a function for calculating fuel burn incurred so far (for example, in a particular mission phase or over all previous mission phases); a function for calculating or estimating a threat exposure so far (for example, in a particular mission phase or over all previous mission phases); a function for calculating or estimating a risk incurred so far from, e.g., natural hazards (for example, in a particular mission phase or over all previous mission phases); and a function for calculating or estimating any penalties incurred so far, e.g., for not viewing the target in target area (for example, in a particular mission phase or over all previous mission phases).

A function for calculating incurred costs may utilise measurements taken by sensing equipment onboard the aircraft 2. For example, a calculation of fuel burn may use measurements of remaining fuel in the fuel tank(s) of the aircraft 2.

Also for example, for algorithms that look forwards (e.g. Forward Looking algorithms, and Forwards and Backward looking algorithms), it is often desirable to use a function for estimating future costs that will be incurred. Such functions are often referred to as heuristics or heuristic functions. Thus, in this embodiment, for each mission phase for which an optimisation algorithm that looks forwards is specified, a heuristic for estimating future costs is specified.

Examples of heuristic functions for estimating future costs include, but are not limited to: a function for estimating future fuel burn (for example, in a particular mission phase or over all future mission phases); a function for estimating a future threat exposure (for example, in a particular mission phase or over all future mission phases); a function for estimating risks that will be incurred in the future (for example, in a particular mission phase or over all future mission phases); a function for estimating any penalties that will be incurred in the future (for example, in a particular mission phase or over all future mission phases).

A function for calculating future costs may utilise measurements taken by sensing equipment onboard the aircraft 2.

At step s12, the processor 12 determines a route for the aircraft 2 from the first point A to the second point B.

In this embodiment, the processor 12 searches the grids 16 defined for the mission phases for a path through those grids that connects a node associated with the first point A to a node associated with the second point B. The processor 12 uses the specified optimisation algorithms to identify paths in the grids 16 that minimise the specified cost functions.

In particular, in this embodiment, for each mission phase, the processor 12 uses the optimisation algorithm specified for that mission phase to search the grid 16 generated for that mission phase to find a path through that grid 16 that minimises the cost function specified for that mission phase. Thus, a route for each mission phase is determined.

In this embodiment, the processor 12 performs the optimisations for the different mission phases independently from one another. Thus, a separate route for each mission phase is generated. Boundary constraints may be implemented to ensure that an ending point of a route for a given mission phase is the same as a starting point for the route for the following mission phase. The processor 12 may then concatenate the separate routes, thereby producing a route from the first point A to the second point B over all mission phases.

Advantageously, the processor 12 is configured to, when performing an optimisation process for a given mission phase, consider information relating to the following mission phase such that a globally optimum route across all mission phases may be determined.

Advantageously, splitting the optimisation problem into separate independent mission phases, and performing multiple separate optimisation problems as opposed to a single, larger optimisation problem tends to reduce the computational burden on the processor 12. Thus, determination of the route by the processor 12 tends to be quicker.

However, in other embodiments, the optimisation processes for the different mission phases are not performed independently from one another. For example, the processor 12 may simultaneously perform the optimisation process for all mission phases as one single, larger optimisation process. In other words, the processor 12 may consider the optimisation processes for all of the mission phases as a single optimisation problem. This tends to provide that performance of the optimisation process for one mission phase does not de-optimise that of a different mission phase.

At step s14, the processor 12 sends a specification for the determined route to the controller 14.

At step s16, the controller 14 determines one or more control signals for controlling the aircraft 2, and, using the determined control signals, controls the aircraft 2 such that the aircraft 2 follows the determined route. Thus, in this embodiment, the aircraft 2 is controlled to fly from the first point A to the second point B.

Thus, a process in which the aircraft 2 determines and follows a route is provided.

Advantageously, the above described system and method tends to allow for the determination an optimal route.

Advantageously, the route is separated into different mission phases. Different criteria, parameters, optimisation functions, and optimisation algorithms may be specified for each mission phase, thereby allowing for different requirements to be fulfilled during different portions of the route. This tends to be in contrast to conventional route planning methodologies Advantageously, routes for the aircraft may be determined wholly onboard the aircraft. Thus, the method tends to be robust to communications failure between the ground station and the aircraft.

In each of the above generated grids, all nodes tend to represent locations that are reachable by the aircraft from the location corresponding to the start node of that grid.

Also, for each mission phase, any constraints placed upon the aircraft's movement during that mission phase tend to be represented within the grid for that mission phase. This tends to be as a result of a grid for a mission phase being generated using only those movement operations permitted for that mission phase.

Nodes of the above described grids are not determined purely by their location, but are defined by a number of terms in the state vector of a vehicle reaching them.

The above described route planner tends to be particularly advantageous or a military aircraft. In such applications, a wide array of factors is typically considered. Such factors include: civil airspace regulations, military airspace regulations, altitude restrictions, terrain, enemy threat systems, enemy detection devices, objectives to be observed or attacked, weather effects (including clouds that obscure visibility, thunderstorms that could damage the aircraft, and wind that could affect navigation), cooperating aircraft, enemy aircraft, other aircraft traffic, communication links, and internal aircraft factors (including height and speed capability, fuel, sensor type and range, emissions, radar cross section, communications range and bandwidth). The above described method and apparatus advantageously allow for the consideration of these factors during the route planning process.

The above described route planning process tends to be advantageously efficient.

In the above embodiments, the route planning process is performed for a scenario that includes a single unmanned aircraft and a single ground station that are in wireless two-way communication with each other. However, in other embodiments, the aircraft may be a different type of entity, such as a different type of vehicle such as an unmanned land-based vehicle or an unmanned water-based vehicle such as an unmanned submarine. In some embodiments, the scenario may include multiple vehicles. Routes may be determined for each of the multiple vehicles. The multiple vehicles may be configured to communicate with one another such that the routes determined for the multiple vehicles are dependent upon one another. In some embodiments, there is no ground base, or multiple ground bases. Also, in other embodiments, the communications links is a different type of communication link, for example, a wired communication link, or an acoustic communication link (e.g. an underwater acoustic communication link).

The invention claimed is:

1. A method of determining a route for a vehicle (2), the method comprising:
   determining the vehicle (2);
   determining movement restrictions of the vehicle (2) comprising maneuverability restrictions, wherein the maneuverability restrictions comprise at least one of: the vehicle's (2) ability to turn, the vehicle's (2) maximum/minimum altitude above/below which the vehicle (2) is not permitted to fly, and the vehicle's (2) maximum/minimum speed above/below which the vehicle (2) is not permitted to operate;
generating, by one or more processors (12), a grid (16), generating the grid (16) comprising:
specifying a start node (18);
selecting one or more vehicle movement restrictions for the determined vehicle;
using the one or more vehicle movement restrictions for the determined vehicle, specifying one or more movement operations, each movement operation being performable by the vehicle (2);
one or more times, iteratively performing steps (i) and (ii);
wherein step (i) comprises:
for a first iteration of steps (i) and (ii), for each movement operation, adding, to the grid (16), an edge, each edge having a first end and an opposite second end, the first end of each edge being connected to the start node (18); or
for a second and subsequent iteration of steps (i) and (ii), for each node added to the grid (16) in the preceding iteration of steps (i) and (ii) and for each movement operation, adding, to the grid (16), an edge having a first end and an opposite second end, the first end of the edge being connected to that node; and
step (ii) comprises, adding to the grid, at the second end of each of the edges added to the grid at step (i) of this iteration of steps (i) and (ii), a further node (20-24); and the method further comprising:
selecting, by the one or more processors (12), a path through the grid (16) from a first node of the grid (16) along an edge to a second node of the grid (16), wherein the first node corresponding to a first location (A) for the vehicle (2) and the second node corresponding to a second location (B) for the vehicle (2) different from the first location (A), thereby providing a route for the vehicle (2) from the first location (A) to the second location (B) such that the vehicle (2) follows the determined route.

2. The method according to claim 1, the method further comprising controlling, by a controller (14) operatively coupled to the one or more processors (12), the vehicle (2) such that the vehicle (2) follows the determined route.

3. The method according to claim 1, comprising:
specifying a plurality of movement operations, each movement operation being performable by the vehicle; and
a plurality of times, iteratively performing steps (i) and (ii),
wherein the method further comprises specifying a cost function; and
the step of selecting a path through the grid (16) comprises selecting a path that optimises the cost function.

4. The method according to claim 3, wherein:
the method further comprises specifying an optimisation algorithm; and
optimising the cost function comprises implementing the specified optimisation algorithm.

5. The method according to claim 1, wherein
the method further comprises defining a plurality of stages for the route; and
the steps of generating a grid (16) and selecting a path through the grid (16) are performed for each of the defined stages so as to produce a plurality of routes, each route of the plurality of routes being associated with a respective defined stage; and
the method further comprises combining the plurality of routes to produce a final route for the vehicle (2).

6. The method according to claim 5, wherein, for each stage, a set of one or more movement operations used to generate the grid (16) for that stage is different to a set of one or more movement operations used to generate the grid (16) for each of the other stages.

7. The method according to claim 5, wherein
the method further comprises, for each stage, specifying a different cost function; and
for each stage, the step of selecting a path through the grid (16) comprises selecting a path that optimises the cost function specified for that stage.

8. The method according to claim 7, wherein:
the method further comprises, for each stage, specifying a different optimisation algorithm; and
for each stage, optimising the cost function comprises implementing the optimisation algorithm specified for that stage.

9. The method according to claim 1, wherein the one or more processors (12) are located onboard the vehicle (2).

10. The method according to claim 1, wherein the vehicle (2) is an unmanned aircraft.

11. An apparatus for determining a route for a vehicle (2), the apparatus comprising one or more processors (12) configured to:
determine the vehicle (2);
determine movement restrictions of the vehicle (2) comprising maneuverability restrictions, wherein the maneuverability restrictions comprise at least one of: the vehicle's (2) ability to turn, the vehicle's (2) maximum/minimum altitude above/below which the vehicle (2) is not permitted to fly, and the vehicle's (2) maximum/minimum speed above/below which the vehicle (2) is not permitted to operate;
generate a grid (16), generating the grid (16) comprising:
specifying a start node (18);
selecting one or more vehicle movement restrictions for the determined vehicle;
using the one or more vehicle movement restrictions for the determined vehicle, specifying one or more movement operations, each movement operation being performable by the vehicle (2);
one or more times, iteratively performing steps (i) and (ii); wherein
step (i) comprises:
for a first iteration of steps (i) and (ii), for each movement operation, adding, to the grid (16), an edge, each edge having a first end and an opposite second end, the first end of each edge being connected to the start node (18); or
for a second and subsequent iteration of steps (i) and (ii), for each node added to the grid (16) in the preceding iteration of steps (i) and (ii) and for each movement operation, adding, to the grid (16), an edge having a first end and an opposite second end, the first end of the edge being connected to that node; and
step (ii) comprises, adding to the grid (16), at the second end of each of the edges added to the grid at step (i) of this iteration of steps (i) and (ii), a further node (20-24); and the one or more processors being further configured to:
select a path through the grid (16) from a first node of the grid (16) along an edge to a second node of the grid (16), wherein the first node corresponds to a first location (A) for the vehicle (2) and the second node corresponds to a second location (B) for the vehicle (2) different from the first location (A), thereby providing a route for the vehicle (2) from the first location (A) to the second location (B) such that the vehicle (2) follows the determined route.

12. The apparatus according to claim 11, wherein the one or more processors (12) is located onboard the vehicle (2); and the apparatus further comprises a controller (14) located onboard the vehicle (2) and operatively coupled to the one or more processors (12), the controller (14) being configured to control the vehicle (2) such that the vehicle (2) follows the determined route.

13. An unmanned aircraft (2) comprising the apparatus according to claim 11.

14. A non-transitory machine readable storage medium storing a program or plurality of programs arranged such that when executed by a computer system or one or more processors, it/they cause the computer system or the one or more processors to operate in accordance with the method of claim 1.

\* \* \* \* \*